(12) United States Patent
Dassow et al.

(10) Patent No.: US 8,161,114 B1
(45) Date of Patent: Apr. 17, 2012

(54) METHOD FOR TRANSFERRING INFORMATION USING A DEFINED DATA STRUCTURE

(75) Inventors: Heiko Dassow, Griesheim (DE); Birgit Frohnhoff, Langen (DE); Egbert Terlinde, Erzhausen (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/403,938

(22) PCT Filed: Apr. 15, 1998

(86) PCT No.: PCT/EP98/02204
§ 371 (c)(1),
(2), (4) Date: Jan. 20, 2000

(87) PCT Pub. No.: WO98/49806
PCT Pub. Date: Nov. 5, 1998

(30) Foreign Application Priority Data

Apr. 29, 1997 (DE) .................................. 197 17 948

(51) Int. Cl.
*G06F 15/16* (2006.01)

(52) U.S. Cl. .......... 709/206; 713/179; 713/170; 717/37; 717/141

(58) Field of Classification Search .................. 709/238, 709/231, 246, 236, 206; 370/419; 713/179, 713/170; 717/137, 141
See application file for complete search history.

(56) References Cited

U.S. PATENT DOCUMENTS

| | | | | |
|---|---|---|---|---|
| 5,278,955 A | * | 1/1994 | Forte et al. | 709/206 |
| 5,291,583 A | * | 3/1994 | Bapat | 717/137 |
| 5,317,568 A | * | 5/1994 | Bixby et al. | 370/401 |
| 5,317,742 A | * | 5/1994 | Bapat | 707/3 |
| 5,546,538 A | * | 8/1996 | Cobbley et al. | 709/203 |
| 5,742,668 A | * | 4/1998 | Pepe et al. | 455/415 |
| 5,836,008 A | * | 11/1998 | Goumillou | 370/419 |
| 5,870,749 A | * | 2/1999 | Adusumilli | 1/1 |
| 5,892,904 A | * | 4/1999 | Atkinson et al. | 726/22 |
| 5,892,950 A | * | 4/1999 | Rigori et al. | 341/60 |
| 5,913,164 A | * | 6/1999 | Pawa et al. | 455/427 |
| 5,966,663 A | * | 10/1999 | Gleason | 455/466 |
| 6,112,083 A | * | 8/2000 | Sweet et al. | 455/426.1 |
| 6,247,043 B1 | * | 6/2001 | Bates et al. | 709/200 |
| 6,314,468 B1 | * | 11/2001 | Murphy et al. | 709/236 |
| 6,373,952 B2 | * | 4/2002 | Asano et al. | 380/278 |
| 6,535,910 B1 | * | 3/2003 | Suzuki et al. | 709/207 |
| 6,625,642 B1 | * | 9/2003 | Naylor et al. | 709/206 |

OTHER PUBLICATIONS

Berners-Lee et al., "RFC 1945. Hypertext Transfer Protocol—HTTP 1.0," WWW.IETF.ORG., May 1996, pp. 1-60.

"CMIP: Common Management Information Protocol DER OSI," NTZ Nachrichten Techinische Zeitschrift, Bd. 48, Nr. 6, Jun. 1, 1995, pp. 16-19.

ITU-T X.209, Open Systems Interconnection Model and Notation: Specification of Basic Encoding Rules for Abstract Syntax Notation One, Melbourne, 1988.

(Continued)

*Primary Examiner* — Alina N. Boutah
(74) *Attorney, Agent, or Firm* — Kenyon & Kenyon LLP

(57) ABSTRACT

In a method for transmitting information using a data structure that is defined by the formal language called Abstract Syntax Notation One, the information is transmitted encoded as text. A form of plain-text encoding may generally be used. This enables the use of text-based transmission media, which are in widespread use. Furthermore, it enables fault localization without the use of additional tools.

13 Claims, 1 Drawing Sheet

OTHER PUBLICATIONS

CCITT X.710, Data Communication Networks: Open Systems Interconnection; Management; Common Management Information Service Definition for CCITT Applications, Geneva, 1991.

ITU-T M.3010, Maintenance: International Transmission Systems, Telephone Circuits, Telegraphy, Facsimile and Leased Circuits: Principles for a Telecommunications Management Network, May 1996.

ITU-T X.160, Data Networks and Open System Communication: Architecture for customer network management service for public data networks; Oct. 1996.

ITU-T X.208, Open Systems Interconnection Model and Notation; Specification of Abstract Syntax Notation One, 1988.

CCITT X.711, Data Communication Networks: Open Systems Interconnection (OSI); Common Management Information Protocol Specification for CCITT Applications, Geneva, 1991.

CCITT X.722, Data Communication Networks: Information Technology—Open Systems Interconnection—Structure of Management Information: Guidelines for the definition of managed objects, Geneva, 1992.

Network Working Group, 1157, J. Case et al., A Simple Network Management Protocol, May 1990.

Network Working Group, 1085, M Rose, ISO Presentation Services on top of TCP/IP-based internets, Dec. 1988.

Network Working Group, 1189, U. Warrier et al., The Common Management Information Services and Protocols for the Internet (CMOT and CMIP), Oct. 1990.

Network Working Group, 1214, L Labarre, OSI Internet Management: Management Information Base, Apr. 1991.

RFC 793, Transmission Control Protocol DARPA Internet Program Protocol Specification, Sep. 1991, University of Southern California.

Technical Standard: OSI-Abstract-Data Manipulation API (XOM) Issue 3, The Open Group, May 1996.

* cited by examiner

METHOD FOR TRANSFERRING INFORMATION USING A DEFINED DATA STRUCTURE

FIELD OF THE INVENTION

The present invention relates to a method for transmitting information using a data structure that is defined by the formal language called Abstract Syntax Notation One (ASN.1).

BACKGROUND INFORMATION

Reference is made to the following documents:

| | |
|---|---|
| [NMFTR107] | Network Management Forum Forum TR107: ISO/CCITT and Internet Management: Coexistence and Interworking Strategy Issue 1.0 September 1992 |
| [M.3010] | ITU-T Recommendation M.3010 Maintenance: Telecommunications Management Network Principles for a Telecommunications Management Network 10/92 |
| [X.160] | ITU-T Recommendation X.160 Data Networks and Open System Communications Public Data Networks - Maintenance Architecture for Customer Network Management Service for Public Data Networks 7/94 |
| [X.200] | Data Networks and'Open System Communications Open System Interconnection - Model and Notation Information Technology - Open System Interconnection Basic Reference Model Geneva,1994 |
| [X.208] | ITU-T Recommendation X.208 Specification of abstract syntax notation one (ASN.1) Information technology Open System Interconnection 1988 |
| [X.209] | ITU-T Recommendation X.209 Specification of Basic Encoding Rules for Abstract Syntax Notation One (ASN.1) |
| [X.710] | ITU-T Recommendation X.710 Data Communication Networks Open Systems Interconnection Common Management Information Service Definition for CCITT Applications Geneva, 1991 |
| [X.711] | ITU-T Recommendation X.711 Data Communication Networks Open Systems Interconnection Common Management Information Protocol Specification for CCITT Applications Geneva, 1991 |
| [X.722] | ITU-T Recommendation X.722 Data Communication Networks Open Systems Interconnection Structure of Management Information Guidelines for the Definition of Managed Objects Geneva, 1992 |
| [RFC 1157] | Network Working Group RFC 1157 Simple Network Management Protocol(SNMP) |
| [RFC 1085] | Network Working Group RFC 1085 ISO Presentation Services on top of TCP/IP-based internets M. Rose, Performance Systems International K. McCloghrie, Hughes LAN Systems December 1988 |
| [RFC 1189] | Network Working Group RFC 1189 Common Management Information Services and Protocols for the Internet (CMOT and CMIP). U.S. Warrier, L. Besaw, L. LaBarre, B.D. Handspicker. historic protocol, not recommended status Oct. 1, 1990. |
| [RFC 1214] | Network Working Group RFC 1214 OSI Internet Management: Management Information Base L. Labarre historic protocol, not recommended status |
| [RFC0793] | Network Working Group RFC 0793 Transmission Control Protocol J. Postel. September 1981 OSI Abstract-Data Manipulation API (XOM) CAE Specification Issue 3 x/Open Company Ltd ISBN 1 85912 175 6 |

The following abbreviations are used:

| | | |
|---|---|---|
| ASN.1 | Abstract Syntax Notation One | [X.208] |
| BER | Basic Encoding Rules | [X.209] |
| CMIP | Common Management Information Protocol | [X.711] |
| CMIPDU | Common Management Information Protocol Data Unit | [X.711] |
| CMIS | Common Management Information Service | [X.710] |
| CNM | Customer Management Network | [X.160] |
| DCF | Data Communication Function | |
| DCN | Data Communication Network | |
| GDMO | Guidelines for the Definition of Managed Objects | [X.722] |
| OSI | Open System Interconnection | [X.200] |
| SNMP | Simple Network Management Protocol | [RFC1157] |
| TCP/IP | Transmission Control Protocol/Internet Protocol | [RFC0793] |
| TMN | Telecommunication Management Network | [M.3010] |
| XOM | X-OPEN, Interface for handling ASN.1 | |

Abstract Syntax Notation One (ASN.1) [X.208] permits the formal specification of data types. It is used for the platform-independent definition of a variety of services and protocols of the OSI 7-layer model (Open System Interconnection [X.200]), among other things. To transmit the stored information, whose structure is defined by ASN.1, there exists a series of methods to encode ASN.1 values, such as the Basic Encoding Rules (BER) [X.209]. The BER-encoded information can then be transmitted in binary form with the help of any desired method. In general, transmission protocols from the TCP/IP or OSI family are used.

At the present time, transmitting the various Protocol Data Units (PDUs) from layer 7 of the OSI 7-layer model, as defined in ASN.1, with the help of a purely OSI-based protocol stack, entails substantial outlay. For this reason, the use of these protocols is often avoided, or the lower layers of the OSI protocol stack are replaced with an already existing TCP/IP protocol. As an example of a number of these methods, one might mention CMIP over TCP/IP (CMOT) [RFC1189].

SUMMARY OF THE INVENTION

An object of the present invention is to avoid at least these disadvantages associated with the binary transmission of information, whose structure is defined by ASN.1.

This objective is achieved according to the present invention by transmitting the information encoded as text. A form of plain-text encoding is generally to be used which allows the encoded contents to be read without additional tools.

Some of the advantages of the method according to the present invention lie in the fact that text-based transmission protocols are generally in very widespread use and correspondingly lower in price than binary transmission procedures. In addition, fault localization is much simpler with plain text encoding, so that the costs for implementing any given application are much lower. To summarize some of the advantages:

Due to the widespread use of text-based transmission protocols, such as e-mail, for example, the number of computers that can be reached using such protocols is much greater than those that can be reached when binary transmission methods are used.

So-called firewalls used to insulate companies' internal networks are often open only for text-based transmission protocols.

No additional tools are needed to localize faults in encoded ASN.1 information, since the encoded information is in a form that can be read by human programmers.

The use of very simple protocols means that no great demands are made in terms of the computing power needed for encoding and transmission, so that even lower-end PCs are suited for this purpose.

Transmitting and receiving facilities need not contain complex protocol stacks. The software needed for text-based transmission is already a part of many operating systems.

Unlike BER encoding, the method according to the present invention makes it possible to decode the received data without having to access a reference to the ASN.1 definition internal to the application.

A particularly advantageous further development of the method according to the present invention is the fact that each piece of information transmitted has its data type defined according to ASN.1 transmitted with it, with the data type generally preceding the information and being separated from it by a predefined separator, for example, an equal sign.

This further development allows a use of the method according to the present invention that is particularly useful to the user, in that the information is encoded as text and thus can be output using standard output devices. It also allows simple entry by the user as well as long-term storage of the information in text encoded form.

The protocol that will be generally used in the future for managing public telecommunications networks—also called networks in the following—is CMIP [X.711]. In this context, telecommunications networks can be networks for the transmission of voice, data and images. The structure of the CMIPDU has been formally defined with the aid of ASN.1. The management information transmitted via CMIPDUs is encoded in conformance with the Basic Encoding Rules. An OSI protocol stack is advantageous, for example, for transmitting the CMIP-based management information, particularly for long distances or due to stringent quality requirements. At the same time, however, there are applications for which a much simpler and more cost-effective approach suffices for the transmission of management information. In addition to the implementation of CMIP for SNMP, which is in widespread use in local networks, CMIP is currently also transmitted via TCP/IP, which is technologically simpler than the OSI protocols of the lower protocol layers.

A further refinement of the method according to the present invention provides that the information to be transmitted via CMIP relates to the management of public telecommunications networks. This further refinement makes it irrelevant whether the plain-text encoding used is based on the fact that CMIP was defined in ASN.1, or whether the text-based encoding rules were created independently of that fact.

In addition to the above-mentioned advantages of the method according to the present invention, this further refinement, i.e., text-based CMIP transmission, makes the use of CMIP practical even in cases where cost considerations rule out the more costly transmission via an OSI protocol stack.

In the future, operators of public networks will provide their customers with a management interface by way of which the customers will be able to initiate management operations relevant to the part of the public network they have leased. The customers will then be able to transmit all data that they wish to the operating company via this interface.

An example of this is a request for a dedicated line between site A and site B of a customer's private network. The two sites are to be linked via the public network. To this end, another further development of the method according to the present invention provides that the information be transmitted between a subscriber and a public network and/or its management systems, and that it relate to network management to be performed by the subscriber.

In particular, the present invention contemplates that an e-mail interface is created for text-encoded information. The customer is provided with a cost-effective, yet reliable interface to the network operator. It does so without excluding the advantages of CMIP as a management protocol.

Such an interface between the customer's private management system and that of the network operator makes it possible for customers to not only perform management operations on their own local network, but also on that part of the public network which they use. This is referred to as Customer Network Management. A typical application is, for example, a customer-specific configuration of the network. Immediate reporting of identified faults to the customer is another example of CNM, as is the provision of specific statistical data.

Another further refinement of the present invention includes using character tables for encoding and decoding the information to allow a simple and flexible adaptation to the limited character set of the transmission system. If, for example, a transmission protocol is not able to transmit the "{" and "}" characters, a different typical character can be used instead, without having to fundamentally alter the encoding rules. Thus, without entailing additional technical outlay, the parallel use of different character tables makes it possible to support a plurality of transmission media using different character sets within one and the same application.

Another further refinement of the method according to the present invention provides that the management information be encoded and transmitted automatically, as well as received and decoded automatically.

In the network operator's area, automatic conversion of the text-based transmission to an OSI protocol stack is thus possible at any time. An advantage of this architecture is the fact that not all customers have to administer their own OSI stacks, but rather that the network operator can offer this as a centralized service for all customers.

DETAILED DESCRIPTION

Figure 1:
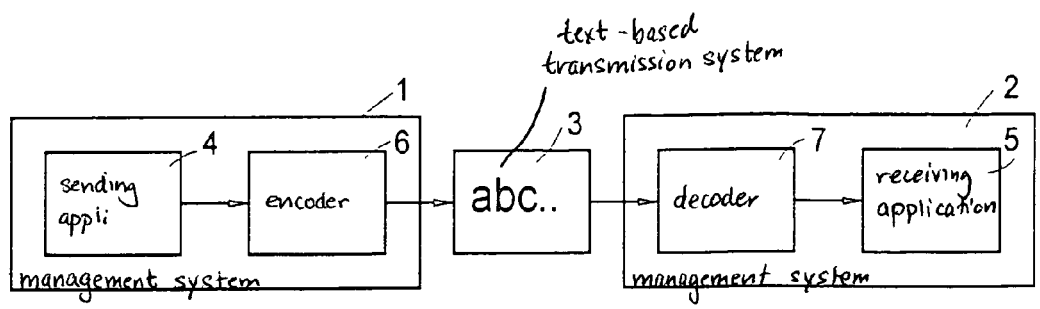
FIG. 1 shows a block diagram illustrating a first embodiment of a facility for realizing a method according to the present invention.

In the embodiment shown in FIG. 1, two management systems 1 and 2 are interconnected to exchange information via a text-based transmission system 3. The useful information to be transmitted can exist in the sending and receiving applications 4 and 5 for management systems 1 and 2 in a variety of proprietary data formats. The structure of these data formats is determined by the tools used to create the applications. In 6 and 7, this useful information is encoded and decoded in accordance with ASN.1 and, additionally, in accordance with the method of the present invention.

Figure 2:
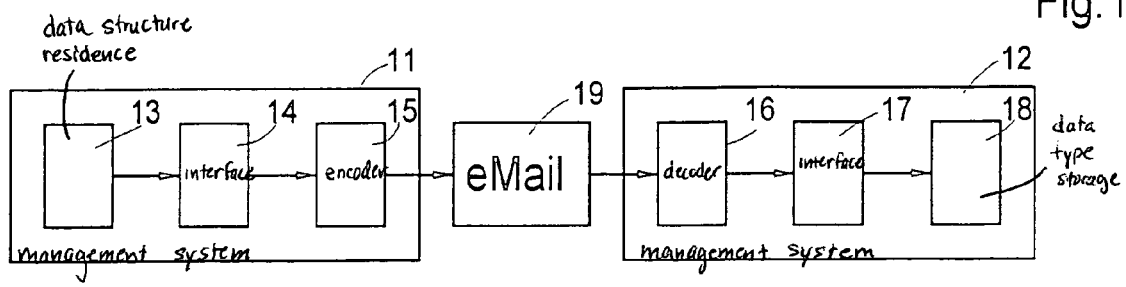
FIG. 2 shows a block diagram illustrating a second embodiment according to the present invention.

FIG. 2 shows one possible realization of the architecture depicted in FIG. 1. Information is transmitted from C data structures, residing in a first management system 11 at 13, to management system 12, where it is stored as C/C++ data types at 18.

The pieces of information resident at 13 are first fed to an XOM interface 14 and encoded there as XOM objects, so that they can be implemented in conformance with ASN.1. These objects are then converted using the method according to the present invention into text-based transmission protocols, which are transmitted as e-mail 19 and received by management system 12. There, they are first decoded at 16 and converted into C++ objects, and subsequently stored at 18 as C/C++ data types.

Figure 3:
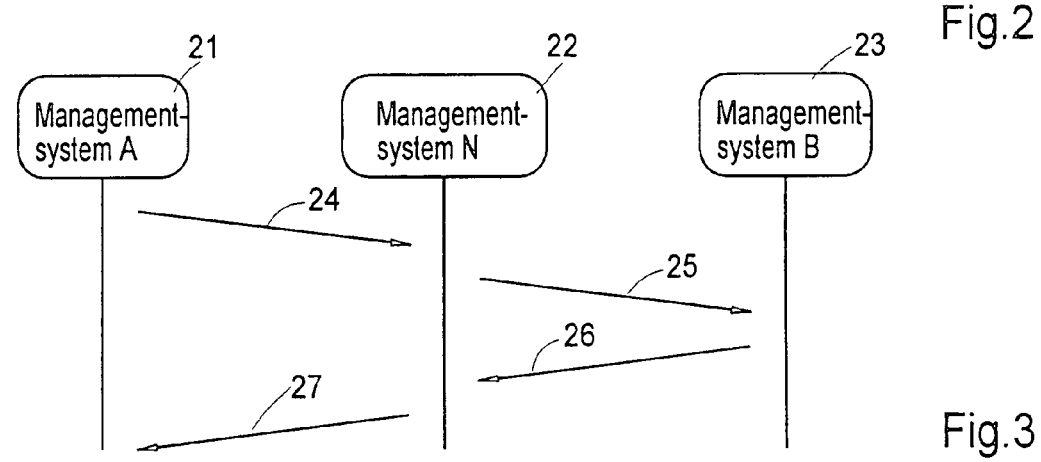
FIG. 3 shows a schematic representation illustrating management of a part of a public telecommunications network used by a subscriber according to the present invention.

FIG. 3 depicts a scenario where a customer asks the operator of a public network to connect two sites (A and B) via a dedicated line. The customer's request 24 is made via his or her management system 21 at site A to management system 22 of network operator N. This management system checks in its own network to see if the request is feasible and then routes it to management system 23 at site B of the customer (25). Once message 26 that the corresponding part of the dedicated line has been able to be successfully set up, is received from there, the through-connection is established in the public network, and the result "line set up" is relayed to site A (27).

Figure 4:
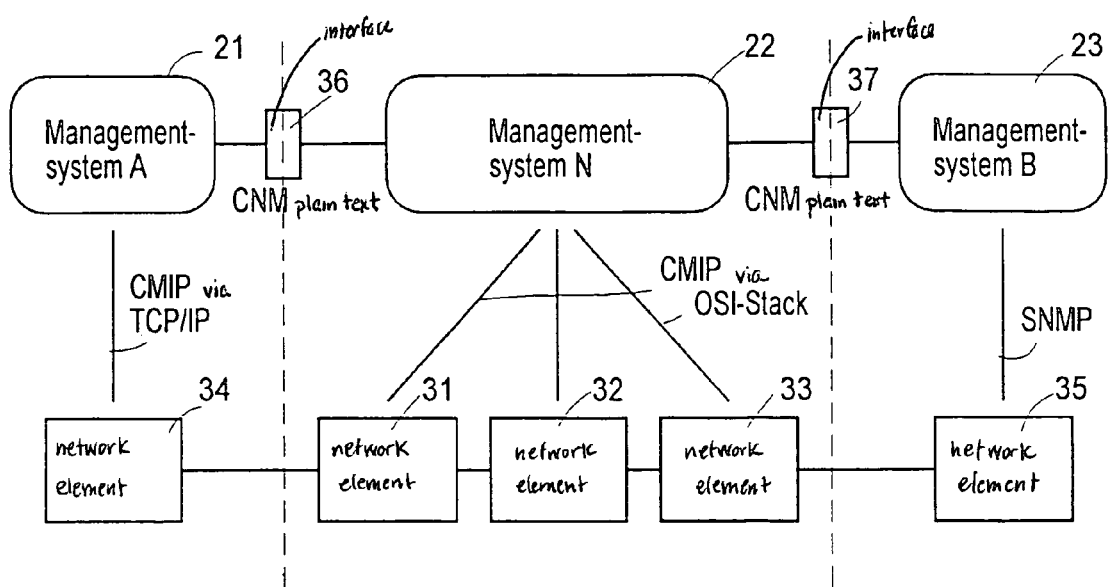
FIG. 4 shows a schematic representation illustrating a text-based transmission of CMIP-based management information between a CNM customer and a network operator.

FIG. 4 clarifies the text-based transmission of CMIP-based management information between a CNM customer and the network operator. Management system 21 at site A and the customer's management system 23 at site B are linked to management system 22 of network operator N, each via a CNM interface 36 and 37, via which the information that has been encoded as plain text in conformance with the method of the present invention is transmitted.

The customer's management systems 21 and 23 have access to the customer's network elements 34 and 35, respectively. For example, this takes place at site A with the help of CMIP via TCP/IP, while at site B, SNMP is used. Management system 22 of network operator N, whose domain is indicated by the dotted lines in FIG. 4, has access to network elements 31 through 33 of the public network. This access is performed using CMIP via a 7-layer OSI protocol stack.

Network operator N offers the customer a CNM service, which enables the customer to use its own management application or one provided by the network operator to route its management requests to management system 22 of the public network. The management information to be transmitted is automatically encoded as plain text at the customer's site within the customer's management application, and is transmitted via a text-based protocol to the network operator's management system 22. This message is either received automatically by management system 22 of the network operator or that of a CNM service provider, and is further processed directly; or a conversion takes place at 36 and 37 to an OSI protocol stack and to an OSI-based transmission to the network operator's management system.

Management information can also be advantageously communicated to the customer's management systems 21 and 23 using the method of the present invention. To this end, a plain-text message is automatically routed by network operator N to the customer. CNM customer's management application automatically receives and decodes this text message, in order to route the transmitted management information onward.

The ASN.1 encoding according to the present invention is carried out in accordance with an established procedure. As a general principle, for each ASN.1 type, the tag is first encoded in the form of an appropriate name (e.g., "INTEGER" for Universal Tag 2) that conforms with the ASN.1 standard, and a "=" character is inserted as a separator. The value is then encoded in the manner predetermined for that type. If an ASN.1 data type, for its part, is made up of other data types, then, when its value is encoded, the tags and values of the data types it contains are also encoded.

Two variants are defined for the encoding rules, both of which are contained in this patent claim. The standard variant suffices completely for encoding the ASN.1 version and is simple to implement. In the case of the expanded variant, the encoded text is provided with additional information taken from the ASN.1 type definition. This clearly simplifies fault localization, in comparison to both the standard variant of plain-text encoding and the binary-encoded form. However, using the expanded variant increases the outlay entailed in application development. For at least that reason, it is also permissible to use only selected parts of the expanded encoding, as long as this is done consistently in the transmitter and receiver. If the expanded variant is provided for encoding a special data type, it is explained below in the description of the appropriate data types.

The following sections specify the ASN.1 definition relevant to the description of the encoding rules for the individual data types, and give one or more encoding examples.

BOOLEAN

Encoding of a Boolean data type is performed by encoding the text "BOOLEAN" for the type and the texts "TRUE#" or "FALSE#" for the value:

| ASN.1 definition | Encoding (several examples) |
| --- | --- |
| Bol::= BOOLEAN | BOOLEAN=TRUE# |
|  | BOOLEAN=FALSE# |

INTEGER

An integer value is designated by the text "INTEGER" and the corresponding value in the format of a decimal number. Only negative numbers are to be given a sign. The encoding of the value is terminated by a "#" character.

| ASN.1 definition | Encoding (several examples) |
| --- | --- |
| Int::= INTEGER | INTEGER=123# |
|  | INTEGER=−123# |

BIT STRING

A bit string is encoded using the text "BIT STRING". The value is encoded by a binary list contained in "{ }" characters and identified by a preceding "B" for binary, and by the number of encoded elements. Hexadecimal encoding instead of binary encoding is identified accordingly by an "H". If the number of bits is not an integral multiple of four, the undefined low-order bits (rightmost) are to be encoded using the binary value "0". For both binary and hexadecimal encoding, it is possible in conformance with the ASN.1 definition, to do without the encoding of elements situated at the end, if they are encoded with the value "0".

In the expanded encoding, the identifiers of the elements are listed, whose binary value corresponds to a "1". The beginning of the list is identified by the "{" character, and the end by the "}" character. A "/" character is used as the separator in this list.

| ASN.1 definition | Encoding (multiple variants) |
|---|---|
| BitStr::= BIT STRING { | BIT STRING=B5{01100} |
| ele(0), | BIT STRING=B3{011} |
| ele(1), | BIT STRING=H2{70} |
| ele(2), | BIT STRING=H1{7} |
| ele(3), | |
| ele(4) | |
| | Expanded encoding: |
| | BIT STRING={ele(1)/ele(2)} |
| | BIT STRING=B5{00000} |
| | BIT STRING=B1{0} |
| | BIT STRING=H1{0} |
| | Expanded encoding: |
| | BIT STRING={ } |

OCTET STRING

An octet string is encoded using the text "OCTET STRING". The value is encoded through a binary list enclosed in "{ }" characters and preceded by a "B" for binary and the number of encoded elements. Hexadecimal encoding can also be used; it is designated by an "H". A "/" character is used as the separator between the individual octet values.

| ASN.1 definition | Encoding |
|---|---|
| OctStr::= OCTET STRING | OCTET STRING=B2{11100001/ 11111111} |
| | OCTET STRING=H2{E1/FF} |

NULL

Encoding of the ASN.1 data type null is performed using the text "NULL=NULL#".

| ASN.1 definition | Encoding |
|---|---|
| Null=NULL | NULL=NULL# |

OBJECT IDENTIFIER

The ASN.1 data type object identifier is encoded using the text "OBJECT IDENTIFIER". The value is encoded by listing the ordinal numbers of the nodes in the registration tree, from the root element to the registered element, and preceding the listing with the encoding of the text "NUMERIC". The numerical values of this list are separated by periods. The encoding of the value is terminated by "#" characters.

In expanded encoding, designated by the text "Symbolic", a unique mnemonic identifier is used in place of the less meaningful numeric sequences. That, of course, requires that a clear tabular relationship conforming to a set theory be created between identifiers and object identifiers. A combination of mnemonic identifiers and numerical sequences is not permissible. The encoding of the value is terminated by "#" characters.

| ASN.1 definition | Encoding |
|---|---|
| Obj::= OBJECT IDENTIFIER | OBJECT IDENTIFIER=Numeric, 1.2.2.1.4## |
| | Expanded encoding |
| | OBJECT IDENTIFIER=Symbolic, systemId# |

EXTERNAL

The tag of the data type external is encoded using the text "EXTERNAL". The encoding of values of this data type is derived from the encoding rules for the following SEQUENCE:

```
SEQUENCE
{
  direct-reference        OBJECT IDENTIFIER OPTIONAL,
  indirect-reference      INTEGER OPTIONAL,
  data-value-descriptor   ObjectDescriptor OPTIONAL,
  encoding                CHOICE
  {
    single-ASN1-type      [0] IMPLICIT ANY,
    octet-aligned         [1] IMPLICIT OCTET STRING,
    arbitrary             [2] IMPLICIT BIT STRING
  }
}
```

REAL

Real numbers are encoded in scientific notation. The encoding of the value is terminated by "#" characters.

| ASN.1 definition | Encoding |
|---|---|
| Real::= REAL | REAL=1.23E45# |

ENUMERATED

The tag of an enumerated type is encoded using the text "ENUMERATED". Values are encoded by specifying the integer associated with the element. The encoding of the value is terminated by "#" characters. In expanded encoding, the element is encoded identically to its definition text.

| ASN.1 definition | Encoding |
|---|---|
| Enum::= ENUMERATED{ | ENUMERATED=1# |
| a(0), | |
| b(1), | expanded encoding: |
| c(2) | ENUMERATED=b(1)# |

SEQUENCE

The tag of a sequence is encoded using the text "SEQUENCE". The encoding of the value of a sequence begins with the number of encoded elements, followed by a "{" character, and terminates with a "}" character. In further specifying the value encoding, we must distinguish between two types of sequences:

In a simple sequence, the ASN.1 types contained in the sequence are encoded in the order in which they appear in the definition. The position numbers are placed in front, each separated by a comma. A "/" character is inserted as a separator between these types. Unused optional elements of the sequence are simply left out in the encoding, so that in such cases, the "/" separator character is also not encoded.

| ASN.1 definition | Encoding (several examples) |
|---|---|
| Seq::= SEQUENCE { | SEQUENCE=2{1, INTEGER=123#/ |
|  | 3, INTEGER=456#) |
| a INTEGER, | SEQUENCE=3{1, INTEGER=1#/2, |
|  | BOOLEAN=FALSE#/3, |
|  | INTEGER=3#} |
| b BOOLEAN OPTIONAL, |  |
| c INTEGER} |  |

The value of a sequence is defined by encoding the enclosed data type the appropriate number of times, with preceding position number, and each separated by a "/" character.

| ASN.1 definition | Encoding (several examples) |
|---|---|
| Seq::= SEQUENCE OF INTEGER | SEQUENCE OF=3{1, |
|  | INTEGER=1#/2, |
|  | INTEGER=2#/3, INTEGER=3#} |
|  | SEQUENCE=0{ } |

SET

The tag of the set type is encoded using the text "SET". The encoding of the value begins with the number of encoded elements, followed by a "{" character, and terminates with a "}" character. In further specifying the value encoding, we must distinguish between two kinds of set data types:
In a simple set type, the ASN.1 types contained in the definition are encoded in the order in which they appear in the definition. The position numbers are placed in front, each separated by a comma. A "/" character is inserted as a separator between these types. Unused optional elements of the set are simply left out when encoding, so that in such cases, the "/" separator character is also not encoded.

| ASN.1 definition | Encoding (several examples) |
|---|---|
| Set ::= SET | SET=2{1, INTEGER=123#/2, |
|  | BOOLEAN=TRUE#} |
| a INTEGER, |  |
| b BOOLEAN, |  |
| c OBJECT IDENTIFIER optional} |  |

The value of a set of type is defined by encoding the enclosed data type the appropriate number of times, with preceding position number, with each separated by a "/" character.

| ASN.1 definition | Encoding (several examples) |
|---|---|
| Set::= SET OF INTEGER | SET=3{1, INTEGER=1#/2, INTEGER=2#/ |
|  | 3, INTEGER=3#) |
|  | SET={ } |

Character Strings

Encoding is identical for the various string types and the subtypes derived therefrom. The type is encoded using the text "NumericString", "PrintableString", "TeletexString", "VideotexString", "VisibleString", "IA5String", "GraphicString", "GeneralString", "ObjectDescriptor", "UTCTime" or "GeneralizedTime", for example, depending on which type is involved.

If no special characters are contained, and no characters which cannot be encoded, simple value encoding can be used. It is introduced by the text "simple" and, separated by a "," character, followed by the number of characters included. The text itself then follows as uncoded text, enclosed in curly braces. If encoding is not possible with simple value encoding, expanded encoding is used, which is introduced by the text "complex". Separated by a "," character, the encoding of the number of contained characters follows, and then a "{" character. The codes of the individual characters are then encoded in hexadecimal form, separated by "/" characters from each other. The encoding is terminated by a "}" character.

| ASN.1 definition | Encoding (several examples) |
|---|---|
| Str ::= GeneralString | GraphicString=simple,3{xyz} |
|  | GeneralString=complex,3{78/79/7A} |

CHOICE

The choice type is encoded using the text "CHOICE". The encoding of the value of a choice is similar to the encoding of a sequence, and begins with the number "1" for the number of elements encoded in the choice. The encoding of the element contained begins with a "{" character and terminates with a "}" character. Before the encoding of the type, its position is encoded, separated by a comma.

| ASN.1 definition | Encoding (several examples) |
|---|---|
| Bsp::= CHOICE { | CHOICE=1{2, GraphicString= |
| simple.3{A}} |  |
| typ1 INTEGER, | CHOICE=1{1, INTEGER=123#} |
| typ2 GraphicString } |  |

ANY DEFINED BY

The type ANY DEFINED BY is defined by the string "ANY". The value of an ANY type is encoded as a type of its own, unlike BER encoding. Since the ANY DEFINED BY type is only permitted within a SEQUENCE or a SET, the example shows the corresponding definition within a sequence definition. For the encoding, first the text "1{" is encoded, and then the type intended for the ANY type. The definition is terminated by the "}" character.

| ASN.1 definition | Encoding |
|---|---|
| Seq::= SEQUENCE{ | SEQUENCE=2{1, INTEGER=1#/2, |
|  | ANY={INTEGER=5#}} |
| i INTEGER; |  |
| a ANY DEFINED BY i } |  |

Referencing an Information Model

Unlike plain-text encoding, which can be decoded without knowing anything of the information model, a BER encoding requires a reference to the information model, stored in metadata format. To enable encoding by referencing metadata from within plain-text encoding as well, it is possible for the metadata to be used to precede any type encoding. This metadata is then valid only for that type and any types contained in it.

| ASN.1 definition | Encoding |
|---|---|
| Bsp::= INTEGER | SetMetaData=Dateiname, INTEGER=123# |

What is claimed is:

1. A method for transmitting information by a processor, comprising the steps of:
    using a data structure that is defined by a formal language called Abstract Syntax Notation One;
    transmitting the information encoded as plain text; and
    transmitting a designation of a data type with each piece of the transmitted information, the designation of the data type being defined by the formal language called Abstract Syntax Notation One,
    wherein the encoded text is decoded without accessing a reference to an Abstract Syntax Notation One definition internal to an application.

2. The method according to claim 1, wherein the step of transmitting the designation includes the steps of placing the designation in front of each piece of the transmitted information and separating the designation from each piece of the transmitted information by a predefined separator character.

3. The method according to claim 2, wherein the step of separating the designation includes the step of separating the designation from each piece of the transmitted information by an equal sign.

4. The method according to claim 1, further comprising the step of:
    outputting a form of the encoded information by using a standard, readily available output facility.

5. The method according to claim 1, further comprising the step of:
    transmitting the encoded information via Common Management Information Protocol, the encoded information relating to management of public telecommunications networks.

6. The method according to claim 1, further comprising the step of:
    transmitting the encoded information between a subscriber system and a public telecommunications network, the encoded information relating to a subscriber system performed management of the public telecommunications network.

7. The method according to claim 1, further comprising the step of:
    creating an e-mail interface for transmitting the text-encoded information.

8. The method according to claim 1, further comprising the step of:
    using encoding tables, the encoding tables being adaptable to character sets of transmitting systems.

9. The method according to claim 1, further comprising the steps of:
    automatically encoding and sending management information; and
    automatically receiving and decoding the management information.

10. A method for transmitting information by a processor, comprising:
    using a data structure that is defined by a formal language called Abstract Syntax Notation One;
    transmitting information encoded as text;
    transmitting the encoded information between a subscriber system and a public telecommunications network, the encoded information relating to a subscriber system performed management of the public telecommunications network; and
    creating an e-mail interface which is utilized for transmitting the text-encoded information,
    wherein the encoded text is decodable without accessing a reference to an internal Abstract Syntax Notation One definition.

11. The method of claim 10, wherein the e-mail interface allows for management operations to be performed on at least one of the subscriber system and the public telecommunications network.

12. A method for transmitting information by a transmitting machine, comprising the steps of:
    using a data structure defined by Abstract Syntax Notation One;
    transmitting the information encoded as plain text;
    decoding the encoded text without accessing a reference to an internal Abstract Syntax Notation One definition; and
    transmitting the encoded information via Common Management Information Protocol, the encoded information relating to management of public telecommunications networks.

13. The method of claim 11, wherein the management operations involve transmission of management information, and the transmission of and encoding of management information is effected automatically.

* * * * *